US012750799B2

(12) United States Patent
Wei et al.

(10) Patent No.: US 12,750,799 B2
(45) Date of Patent: Sep. 29, 2026

(54) HANDLING COLLISION WITH SYNCHRONIZATION SIGNAL BLOCK RECEPTION

(71) Applicant: QUALCOMM Incorporated, San Diego, CA (US)

(72) Inventors: Chao Wei, Beijing (CN); Jing Lei, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/560,844

(22) PCT Filed: Jul. 21, 2021

(86) PCT No.: PCT/CN2021/107506

§ 371 (c)(1),
(2) Date: Nov. 14, 2023

(87) PCT Pub. No.: WO2023/000190

PCT Pub. Date: Jan. 26, 2023

(65) Prior Publication Data

US 2024/0284361 A1 Aug. 22, 2024

(51) Int. Cl.
*H04J 3/06* (2006.01)
*H04W 56/00* (2009.01)
(Continued)

(52) U.S. Cl.
CPC ... *H04W 56/0015* (2013.01); *H04W 72/1268* (2013.01); *H04W 72/566* (2023.01)

(58) Field of Classification Search
USPC ........................................................ 370/503
See application file for complete search history.

(56) References Cited

U.S. PATENT DOCUMENTS

2020/0154449 A1 5/2020 Akkarakaran et al.
2022/0386355 A1* 12/2022 Yi ........................ H04L 5/0044
(Continued)

FOREIGN PATENT DOCUMENTS

WO 2020102191 5/2020
WO 2020163368 A1 8/2020

OTHER PUBLICATIONS

Huawei, et al., "Corrections on Operation of HARQ", 3GPP TSG RAN WG1 Meeting #102-e, R1-2006389, Aug. 28, 2020 (Aug. 28, 2020), 11 Pages, The Whole Document.
(Continued)

*Primary Examiner* — Chuong T Ho
(74) *Attorney, Agent, or Firm* — Harrity & Harrity, LLP

(57) ABSTRACT

Various aspects of the present disclosure generally relate to wireless communication. In some aspects, a user equipment (UE) may identify that a set of resources to be used for reception of a synchronization signal block (SSB) overlaps at least one of a set of resources to be used for a first uplink transmission or a set of resources to be used for a second uplink transmission. The set of resources to be used for the first uplink transmission may overlap the set of resources to be used for the second uplink transmission. The first uplink transmission and the second uplink transmission may have a same priority index value. The UE may resolve an overlap between the first uplink transmission and the second uplink transmission and then resolve an overlap associated with the reception of the SSB. Numerous other aspects are described.

25 Claims, 8 Drawing Sheets

(51) Int. Cl.
*H04W 72/1268* (2023.01)
*H04W 72/566* (2023.01)

(56) References Cited

U.S. PATENT DOCUMENTS

| | | | | |
|---|---|---|---|---|
| 2024/0080878 | A1* | 3/2024 | Kittichokechai | H04W 72/11 |
| 2024/0155603 | A1* | 5/2024 | Li | H04W 72/21 |
| 2024/0306154 | A1* | 9/2024 | Wang | H04L 1/0026 |

OTHER PUBLICATIONS

International Search Report and Written Opinion—PCT/CN2021/107506—ISA/EPO—Mar. 28, 2022.

OPPO: "Remaining Issues on Scheduling and HARQ", 3GPP TSG RAN WG1 #104-e, R1-2100179, Feb. 5, 2021 (Feb. 5, 2021), 2 Pages, The Whole Document.

QUALCOMM: "Summary of the Remaining Issues on HARQ and Scheduling Enhancements for URLLC: Preparation Phase", 3GPP TSG RAN WG1 #102e, R1-2007033, Aug. 28, 2020 (Aug. 28, 2020), 17 Pages, Section 5.

CATT: "Clarification for Processing Order of UL Multiplexing and Cancellation", 3GPP TSG RAN WG1 #100bis, R1-2002060, 3rd Generation Partnership Project (3GPP), Mobile Competence Centre, 650, Route Des Lucioles, F-06921, Sophia-Antipolis Cedex, France, vol. RAN WG1, No. e-Meeting, Apr. 20, 2020-Apr. 30, 2020, Apr. 11, 2020, 6 Pages, XP051875417, Paragraph [0002], Figures 1,2.

CATT: "Remaining Issues on Intra-UE Prioritization", 3GPP TSG RAN WG1 #104-e, R1-2100338, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021, 10 Pages, XP051970941, Paragraph [02.1].

Supplementary European Search Report—EP21950454—Search Authority—The Hague—Feb. 10, 2025.

Xiaomi: "Discussion on Half-Duplex FDD Operation of Redcap UE", 3GPP TSG RAN WG1 #104b-e, R1-2102990, 3rd Generation Partnership Project (3GPP), Mobile Competence Centre, 650, Route Des Lucioles, F-06921, Sophia-Antipolis Cedex, France, vol. RAN WG1, No. e-Meeting, Apr. 12, 2021-Apr. 20, 2021, Apr. 5, 2021, 3 Pages, XP051992610, Paragraph [02.1].

* cited by examiner

HANDLING COLLISION WITH SYNCHRONIZATION SIGNAL BLOCK RECEPTION

CROSS-REFERENCE TO RELATED APPLICATION

This Patent Application is a 371 National Stage of Patent Cooperation Treaty (PCT) Patent Application No. PCT/CN2021/107506, filed on Jul. 21, 2021, entitled "HANDLING COLLISION WITH SYNCHRONIZATION SIGNAL BLOCK RECEPTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for handling a collision with synchronization signal block (SSB) reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying that a set of resources to be used for reception of a synchronization signal block (SSB) overlaps at least one of a set of resources to be used for a first uplink transmission or a set of resources to be used for a second uplink transmission, where the set of resources to be used for the first uplink transmission overlaps the set of resources to be used for the second uplink transmission, and where the first uplink transmission and the second uplink transmission have a same priority index value. The method may include resolving an overlap between the first uplink transmission and the second uplink transmission. The method may include resolving an overlap associated with the reception of the SSB after resolving the overlap between the first uplink transmission and the second uplink transmission.

Some aspects described herein relate to a method of wireless communication performed by a UE. The method may include identifying that a set of resources to be used for a reception of an SSB overlaps at least one of a set of resources to be used for a first uplink transmission or a set of resources to be used for a second uplink transmission, where the set of resources to be used for the first uplink transmission overlaps the set of resources to be used for the second uplink transmission, and where a priority index value of the second uplink transmission is lower than a priority index value of the first uplink transmission. The method may include resolving an overlap between the second uplink transmission and the reception of the SSB. The method may include resolving an overlap associated with the first uplink transmission after resolving the overlap between the second uplink transmission and the reception of the SSB.

Some aspects described herein relate to a UE for wireless communication. The user equipment may include a memory and one or more processors coupled to the memory. The one or more processors may be configured to identify that a set of resources to be used for reception of an SSB overlaps at least one of a set of resources to be used for a first uplink transmission or a set of resources to be used for a second uplink transmission. The one or more processors may be configured to resolve an overlap between the first uplink transmission and the second uplink transmission. The one or more processors may be configured to resolve an overlap associated with the reception of the SSB after resolving the overlap between the first uplink transmission and the second uplink transmission.

Some aspects described herein relate to a UE for wireless communication. The UE may include a memory and one or more processors coupled to the memory. The one or more processors may be configured to identify that a set of resources to be used for a reception of an SSB overlaps at least one of a set of resources to be used for a first uplink transmission or a set of resources to be used for a second uplink transmission. The one or more processors may be configured to resolve an overlap between the second uplink transmission and the reception of the SSB. The one or more processors may be configured to resolve an overlap associated with the first uplink transmission after resolving the overlap between the second uplink transmission and the reception of the SSB.

Some aspects described herein relate to a non-transitory computer-readable medium that stores a set of instructions for wireless communication by a UE. The set of instructions, when executed by one or more processors of the UE, may cause the UE to identify that a set of resources to be used for reception of an SSB overlaps at least one of a set of resources to be used for a first uplink transmission or a set of resources to be used for a second uplink transmission. The set of instructions, when executed by one or more processors of the UE, may cause the UE to resolve an overlap between the first uplink transmission and the second uplink transmission. The set of instructions, when executed by one or more processors of the UE, may cause the UE to resolve an overlap associated with the reception of the SSB after resolving the overlap between the first uplink transmission and the second uplink transmission.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to identify that a set of resources to be used for a reception of an SSB overlaps at least one of a set of resources to be used for a first uplink transmission or a set of resources to be used for a second uplink transmission. The set of instructions, when executed by one or more processors of the one or more instructions that, when executed by one or more processors of a UE, may cause the one or more instructions that, when executed by one or more processors of a UE to resolve an overlap between the second uplink transmission and the reception of the SSB. The set of instructions, when executed by one or more processors of the one or more instructions that, when executed by one or more processors of a UE, may cause the one or more instructions that, when executed by one or more processors of a UE to resolve an overlap associated with the first uplink transmission after resolving the overlap between the second uplink transmission and the reception of the SSB.

Some aspects described herein relate to an apparatus for wireless communication. The apparatus may include means for identifying that a set of resources to be used for reception of an SSB overlaps at least one of a set of resources to be used for a first uplink transmission or a set of resources to be used for a second uplink transmission, where the set of resources to be used for the first uplink transmission overlaps the set of resources to be used for the second uplink transmission, and where the first uplink transmission and the second uplink transmission have a same priority index value. The apparatus may include means for resolving an overlap between the first uplink transmission and the second uplink transmission. The apparatus may include means for resolving an overlap associated with the reception of the SSB after resolving the overlap between the first uplink transmission and the second uplink transmission.

Some aspects described herein relate to an apparatus for wireless communication. The apparatus may include means for identifying that a set of resources to be used for a reception of an SSB overlaps at least one of a set of resources to be used for a first uplink transmission or a set of resources to be used for a second uplink transmission, where the set of resources to be used for the first uplink transmission overlaps the set of resources to be used for the second uplink transmission, and where a priority index value of the second uplink transmission is lower than a priority index value of the first uplink transmission. The apparatus may include means for resolving an overlap between the second uplink transmission and the reception of the SSB. The apparatus may include means for resolving an overlap associated with the first uplink transmission after resolving the overlap between the second uplink transmission and the reception of the SSB.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
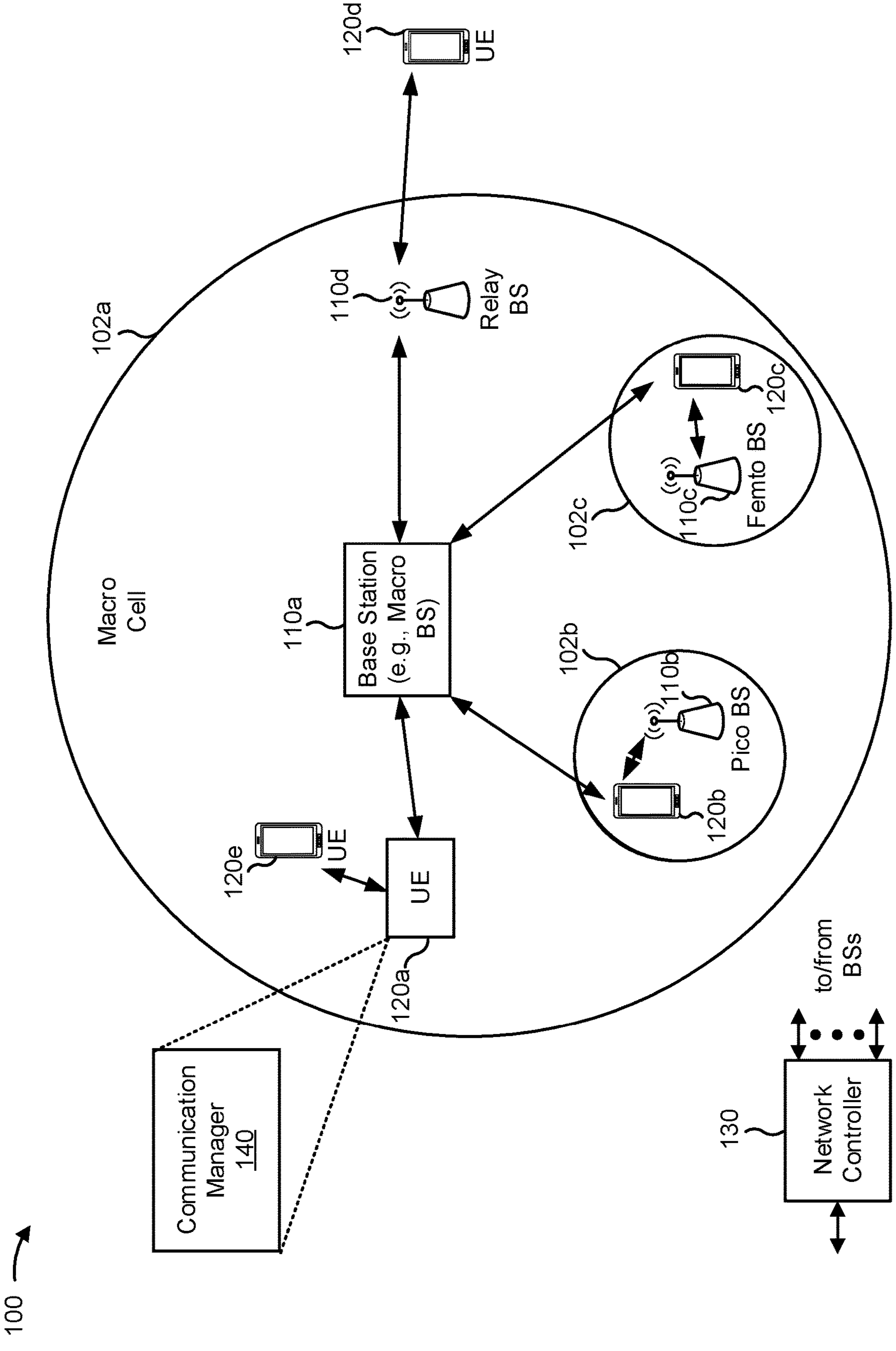
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify that a set of resources to be used for reception of an SSB overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein the first uplink transmission and the second uplink transmission have a same priority index value; resolve an overlap between the first uplink transmission and the second uplink transmission; and resolve an overlap associated with the reception of the SSB after resolving the overlap between the first uplink transmission and the second uplink transmission. Additionally, or alternatively, the communication manager 140 may perform one or more other operations described herein.

In some aspects, the UE 120 may include a communication manager 140. As described in more detail elsewhere herein, the communication manager 140 may identify that a set of resources to be used for a reception of an SSB overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein a priority index value of the second uplink transmission is lower than a priority index value of the first uplink transmission; resolve an overlap between the second uplink transmission and the reception of the SSB; and resolve an overlap associated with the first uplink transmission after resolving the overlap between the second uplink transmission and the reception of the SSB. Additionally, or alternatively, the communication manager 140 may perform one or more other operations described herein.

As indicated above, FIG. 1 is provided as an example. Other examples may differ from what is described with regard to FIG. 1.

Figure 2:
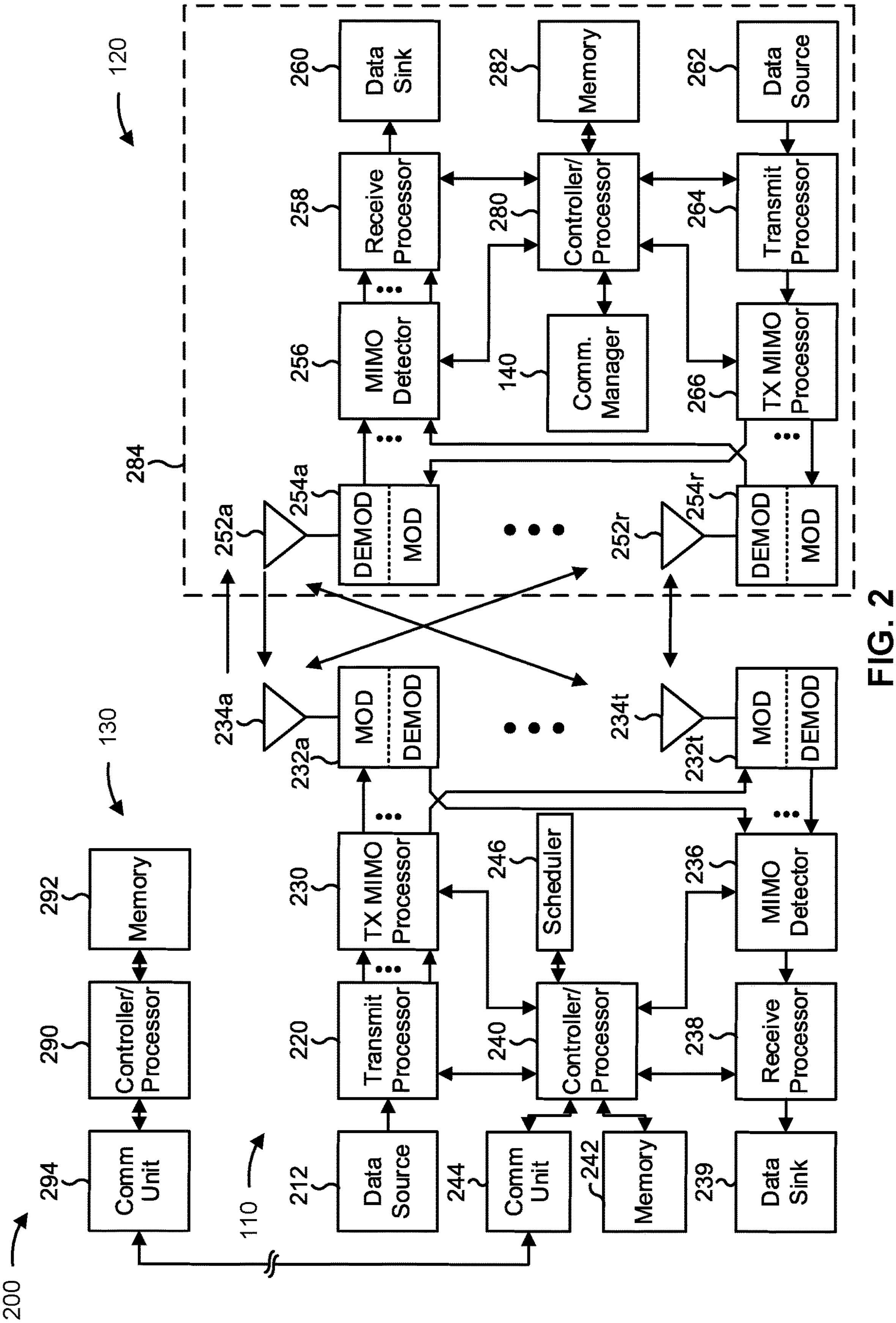
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232.

Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with handling a collision with SSB reception, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for identifying that a set of resources to be used for reception of an SSB overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein the first uplink transmission and the second uplink transmission have a same priority index value; means for resolving an overlap between the first uplink transmission and the second uplink transmission; and/or means for resolving an overlap associated with the reception of the SSB after resolving the overlap between the first uplink transmission and the second uplink transmission. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for identifying that a set of resources to be used for a reception of an SSB overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein a priority index value of the second uplink transmission is lower than a priority index value of the first uplink transmission; means for resolving an overlap between the second uplink transmission and the reception of the SSB; and/or means for resolving an overlap associated with the first uplink transmission after resolving the overlap between the second uplink transmission and the reception of the SSB. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In some wireless communication systems, a set of resources of a synchronization signal block (SSB) to be received by a UE (e.g., an SSB for which a UE is to attempt reception) may overlap a set of resources to be used by the UE for transmitting an uplink transmission (e.g., a dynamically scheduled uplink transmission, a semi-statically configured uplink transmission, or the like).

In such a scenario, in an NR system for operation on a single carrier/cell in an unpaired spectrum, a time division duplex (TDD) UE is configured to cancel (e.g., refrain from transmitting) an uplink transmission (e.g., a physical uplink shared channel (PUSCH) transmission, a physical uplink control channel (PUCCH) transmission, a physical random access channel (PRACH) transmission) for a set of symbols of a slot indicated to the TDD UE for reception of an SSB if the uplink transmission would overlap with any symbol of the set of symbols. Further, the TDD UE is configured to cancel transmission of a sounding reference signal (SRS) in the set of symbols. That is, a TDD UE may be configured to cancel an uplink transmission if any of symbols of the uplink transmission overlap with any SSB symbols, and the TDD UE may cancel any SRS symbols that overlap with an SSB symbol.

For some other UEs in an NR system, such as a frequency division duplex (FDD) UE (e.g., a half-duplex FDD reduced capability (RedCap) UE), a collision between an SSB to be received by the UE and an uplink transmission to be transmitted by the UE may be handled based on a type of the uplink transmission. For example, for a dynamically scheduled uplink transmission that overlaps with an SSB, options for handling the collision may include: (1) prioritizing the dynamically scheduled uplink transmission over the SSB (i.e., canceling the SSB reception and transmitting the dynamically scheduled uplink transmission) (2) using the same collision handling principles used for a TDD UE (i.e., such that the SSB is prioritized over the dynamically scheduled uplink transmission, as described above), or (3) leaving whether to receive the SSB or transmit the uplink transmission to UE implementation. For a semi-statically configured uplink transmission that overlaps with an SSB, options for handling the collision may include (1) recognizing the collision as an error (i.e., leaving the prevention of such collisions up to a scheduling base station), (2) using the same collision handling principles used for a TDD UE (i.e., such that the SSB is prioritized over the semi-statically configured uplink transmission, as described above), or (3) leaving whether to receive the SSB or transmit the uplink transmission to UE implementation. Therefore, it is possible that a manner in which collisions are handled may differ among different types of uplink transmissions. For example, it is possible that dynamically scheduled uplink transmissions may be prioritized over SSBs, while SSBs may be prioritized over semi-statically configured uplink transmissions.

In a scenario in which SSB reception has a higher priority than semi-statically configured uplink transmissions (e.g., a PUCCH carrying periodic channel state information (CSI) or a hybrid automatic repeat request acknowledgement (HARQ-ACK) corresponding to a semi-persistent scheduling (SPS) physical downlink shared channel (PDSCH), a PUSCH transmission corresponding to a configured grant, or the like), but has a lower priority than dynamically scheduled uplink transmissions (e.g., a PUCCH carrying HARQ in response to a downlink control information (DCI) format detection, a PUSCH transmission dynamically scheduled by an uplink grant in a DCI, or the like), there is ambiguity on channel prioritization and multiplexing when an SSB reception, a dynamically scheduled uplink transmission, and a semi-statically configured uplink transmission overlap one another. For example, if an overlap between an SSB reception and a dynamically scheduled PUSCH transmission is resolved first, then the SSB reception is canceled. Then, for the collision between the dynamically scheduled PUSCH transmission and a semi-statically configured PUCCH transmission (including a hybrid automatic repeat request acknowledgment (HARQ-ACK) and/or channel state information (CSI) report), both the dynamically scheduled and the semi-statically configured uplink transmissions are transmitted by, for example, multiplexing the HARQ-ACK and/or CSI report in the dynamically scheduled PUSCH transmission. However, if an overlap between the SSB reception and the semi-statically configured PUCCH transmission is resolved first, then the semi-statically configured PUCCH transmission is canceled. Then, for the collision between the SSB reception and the dynamically scheduled PUSCH transmission, the SSB reception is canceled and the dynamically scheduled PUSCH transmission is transmitted.

A similar issue occurs in a scenario in which a semi-statically configured PUCCH transmission including a HARQ-ACK and/or CSI report overlaps with an SSB reception and a dynamically scheduled PUSCH transmission, but there is no overlap between the SSB reception and the dynamically scheduled PUSCH transmission. Here, if an overlap between the SSB reception and the semi-statically configured PUCCH transmission is resolved first, then the semi-statically configured PUCCH transmission is canceled. Then, because there is no overlap between the SSB reception and the dynamically scheduled PUSCH transmission, the dynamically scheduled PUSCH transmission is transmitted and the SSB reception is performed. However, if the overlap between the semi-statically configured PUCCH transmission and the dynamically scheduled PUSCH transmission is resolved first, then the HARQ-ACK and/or CSI report associated with the semi-statically configured PUCCH transmission is multiplexed on the dynamically scheduled PUSCH transmission and transmitted accordingly (since there is no collision between the SSB reception and the dynamically scheduled PUSCH transmission).

Notably, the outcome can be different if the semi-statically configured uplink transmission is a configured grant PUSCH transmission and the dynamically scheduled uplink transmission is a PUCCH transmission of a HARQ-ACK (e.g., a HARQ-ACK to be transmitted in response to a downlink control information (DCI) format detection). In such a case, if an overlap between the SSB reception and the semi-statically configured PUSCH transmission is resolved first, then the semi-statically configured PUSCH transmission is canceled. Then, because there is no overlap between the SSB reception and the dynamically scheduled PUCCH transmission, the dynamically scheduled PUCCH transmission of the HARQ-ACK is transmitted and SSB reception is performed. However, if the overlap between the semi-statically configured PUSCH transmission and the dynamically scheduled PUCCH transmission is resolved first, then the dynamically scheduled PUCCH transmission of the HARQ-ACK is multiplexed on the semi-statically configured PUSCH and are canceled due to overlapping with the SSB reception transmission, and SSB reception is performed.

Some techniques and apparatuses described herein enable collision handling associated with SSB reception. In some aspects, the techniques and apparatuses described herein eliminate ambiguity on channel prioritization and multiplexing when an SSB reception, a dynamically scheduled uplink transmission, and a semi-statically configured uplink transmission overlap one another.

For example, in some aspects, a UE may identify that an SSB reception overlaps a first uplink transmission and/or a second uplink transmission, where the first uplink transmission overlaps the second uplink transmission, and the first uplink transmission and the second uplink transmission have a same priority index value. Here, the UE may resolve an overlap between the first uplink transmission and the second uplink transmission first, and then resolve an overlap associated with the reception of the SSB after resolving the overlap between the first uplink transmission and the second uplink transmission.

As another example, in some aspects, a UE may identify that that an SSB reception overlaps a first uplink transmission and/or a second uplink transmission, where the first uplink transmission overlaps the second uplink transmission, and a priority index value of the second uplink transmission is lower than a priority index value of the first uplink transmission. Here, the UE may resolve an overlap between the second uplink transmission and the reception of the SSB first, and then resolve an overlap associated with the first uplink transmission after resolving the overlap between the second uplink transmission and the reception of the SSB.

In some aspects, the techniques and apparatuses described herein may be implemented by, for example, a half-duplex FDD RedCap UE, in order to resolve ambiguity on channel prioritization and multiplexing when an SSB reception, a dynamically scheduled uplink transmission, and a semi-statically configured uplink transmission overlap one another.

Figure 3:
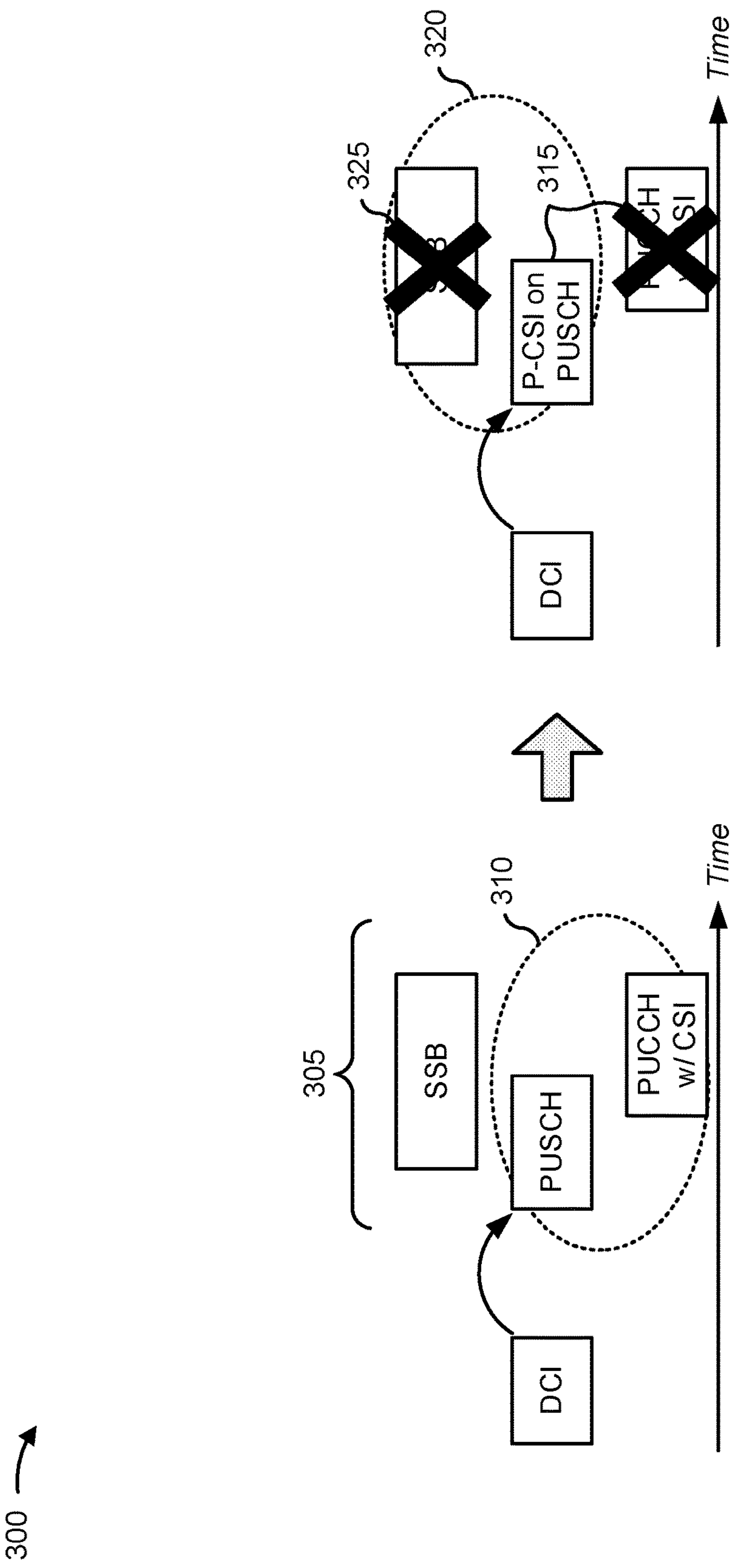
FIGS. 3-5 are diagrams illustrating examples associated with handling a collision with synchronization signal block (SSB) reception, in accordance with the present disclosure.
Figure 4:
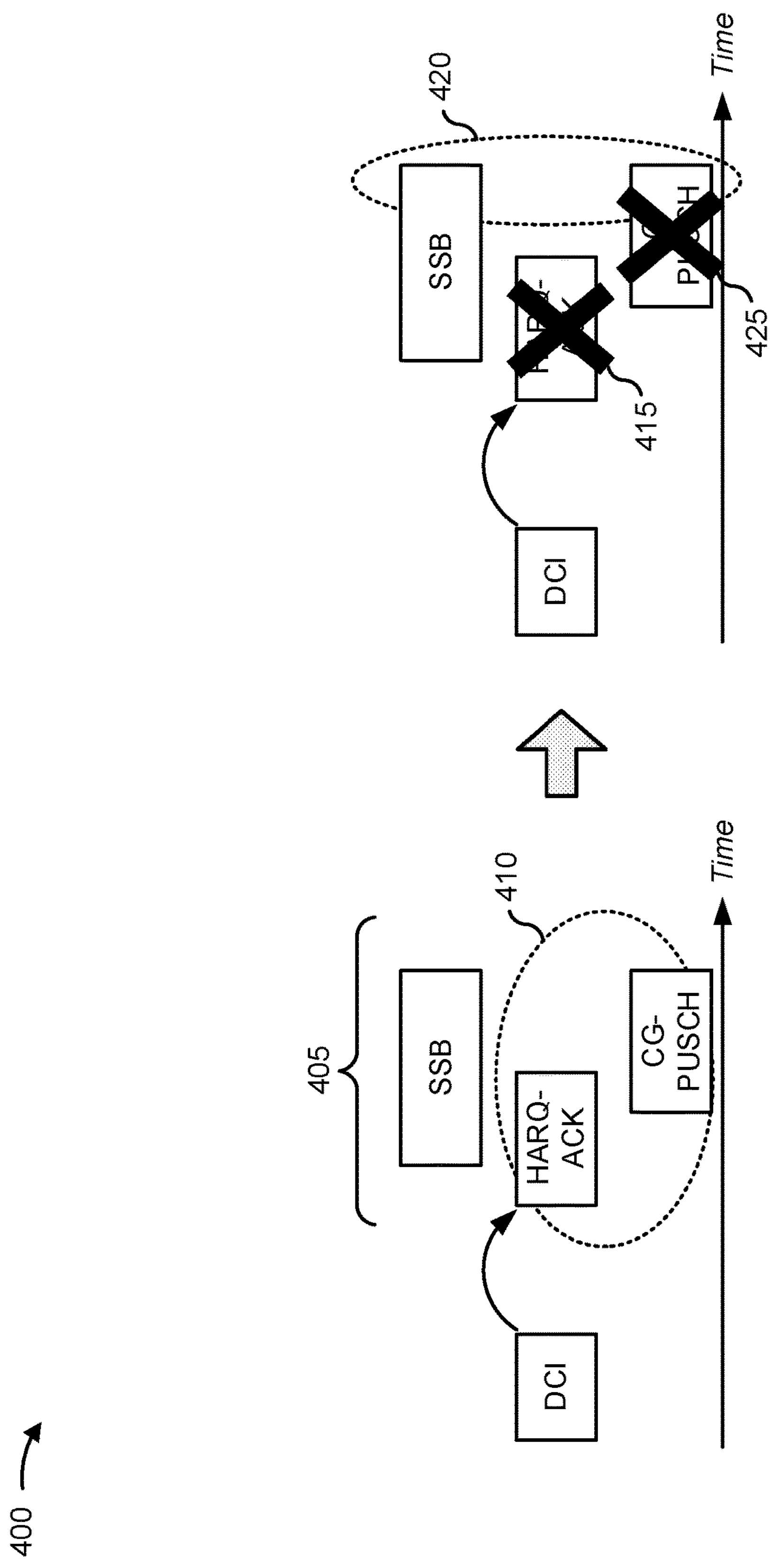

FIGS. 3 and 4 are diagrams illustrating examples 300 and 400, respectively, associated with handling collision with SSB reception in a scenario where a priority of a semi-statically configured uplink transmission is the same as a priority of a dynamically scheduled uplink transmission.

In the example shown in FIG. 3, a UE (e.g., a UE 120) is configured for SSB reception in a particular set of resources, is to transmit a semi-statically configured uplink transmission in a particular set of resources, and is to transmit a dynamically scheduled uplink transmission in a particular set of resources. As shown, the set of resources to be used for the SSB reception overlaps (in the time domain) the set of resources to be used for the semi-statically configured uplink transmission and the set of resources to be used for the dynamically scheduled uplink transmission. In this example, the semi-statically configured uplink transmission is a PUCCH transmission with a HARQ-ACK (e.g., corresponding to a semi-persistent scheduling (SPS) physical downlink shared channel (PDSCH) transmission) and the dynamically scheduled uplink transmission is a PUSCH transmission (e.g., in response to a DCI format detection). Here, a priority of the semi-statically configured PUCCH transmission is the same as a priority of the dynamically scheduled PUSCH transmission (e.g., the semi-statically configured PUCCH transmission and the dynamically scheduled PUSCH transmission may have the same priority index value).

In a first operation, as indicated by reference 305, the UE identifies that the set of resources to be used for the SSB reception overlaps the set of resources to be used for the dynamically scheduled PUSCH transmission and/or the set of resources to be used for the semi-statically configured PUCCH transmission. Notably, in this example, the set of resources to be used for the dynamically scheduled PUSCH transmission overlaps the set of resources to be used for the semi-statically configured PUCCH transmission.

In a second operation, as indicated by reference 310, the UE resolves an overlap between the dynamically scheduled PUSCH transmission and the semi-statically configured scheduled PUCCH transmission. In some aspects, the UE resolves the overlap between the dynamically scheduled PUSCH transmission and the semi-statically configured PUCCH transmission first (i.e., prior to resolving an overlap with the SSB reception) based on the dynamically scheduled PUSCH transmission and the semi-statically configured PUCCH transmission having the same priority. As indicated by reference 315, a result of resolving the overlap between the dynamically scheduled PUSCH transmission and the semi-statically configured PUCCH transmission is that the UE multiplexes the HARQ-ACK and/or CSI report, associated with the semi-statically configured PUCCH transmission, in the dynamically scheduled PUSCH transmission, and cancels the semi-statically configured PUCCH transmission.

In a third operation, as indicated by reference 320, the UE then resolves an overlap between the dynamically scheduled PUSCH transmission with the multiplexed HARQ-ACK and/or CSI report and the SSB reception. In this example, because one or more symbols of the dynamically scheduled PUSCH transmission overlap one or more symbols of the SSB reception, the UE cancels the SSB reception, as indicated by reference 325. Thus, in this example, the UE transmits the dynamically scheduled PUSCH transmission with the multiplexed HARQ-ACK and/or CSI report.

In the example shown in FIG. 4, the is configured for SSB reception in a particular set of resources, is to transmit a semi-statically configured uplink transmission in a particular set of resources, and is to transmit a dynamically scheduled uplink transmission in a particular set of resources. As shown, the set of resources to be used for the SSB reception overlaps (in the time domain) the set of resources to be used for the semi-statically configured uplink transmission and the set of resources to be used for the dynamically scheduled uplink transmission. In this example, the semi-statically configured uplink transmission is a configured grant PUSCH transmission and the dynamically scheduled uplink transmission is a PUCCH transmission with a HARQ-ACK (e.g., in response to a DCI format detection). Here, a priority of the semi-statically configured PUSCH transmission is the same as a priority of the dynamically scheduled PUCCH transmission (e.g., the semi-statically configured PUSCH transmission and the dynamically scheduled PUCCH transmission may have the same priority index value).

In a first operation, as indicated by reference 405, the UE identifies that the set of resources to be used for the SSB reception overlaps the set of resources to be used for the dynamically scheduled PUCCH transmission and/or the set of resources to be used for the semi-statically configured PUSCH transmission. Notably, in this example, the set of resources to be used for the dynamically scheduled PUCCH transmission overlaps the set of resources to be used for the semi-statically configured PUSCH transmission.

In a second operation, as indicated by reference 410, the UE resolves an overlap between the dynamically scheduled PUCCH transmission and the semi-statically configured scheduled PUSCH transmission. In some aspects, the UE resolves the overlap between the dynamically scheduled PUCCH transmission and the semi-statically configured PUSCH transmission first (i.e., prior to resolving an overlap with the SSB reception) based on the dynamically scheduled PUCCH transmission and the semi-statically configured PUSCH transmission having the same priority. As indicated by reference 415, a result of resolving the overlap between the dynamically scheduled PUCCH transmission and the semi-statically configured PUSCH transmission is that the UE multiplexes the HARQ-ACK, associated with the dynamically scheduled PUCCH transmission, in the semi-statically configured PUSCH transmission, and cancels the dynamically scheduled PUCCH transmission.

In a third operation, as indicated by reference 420, the UE then resolves an overlap between the semi-statically configured PUSCH transmission with the multiplexed HARQ-ACK and the SSB reception. In this example, because one or more symbols of the semi-statically configured PUSCH transmission overlap one or more symbols of the SSB reception, the UE cancels the semi-statically configured PUSCH transmission with the multiplexed HARQ-ACK, as indicated by reference 425. Thus, in this example, the UE performs SSB reception in the configured set of SSB resources.

In this way, the UE may resolve an overlap among an SSB reception, a semi-statically configured uplink transmission, and a dynamically scheduled uplink transmission, where the semi-statically configured uplink transmission and the dynamically scheduled uplink transmission have the same priority. For example, in some aspects, the UE may first resolve an overlap between the semi-statically configured uplink transmission and the dynamically scheduled uplink transmission, and may then resolve an overlap with the SSB reception (after resolving the overlap between the semi-statically configured uplink transmission and the dynamically scheduled uplink transmission).

As indicated above, FIGS. 3 and 4 are provided as examples. Other examples may differ from what is described with respect to FIGS. 3 and 4.

Figure 5:
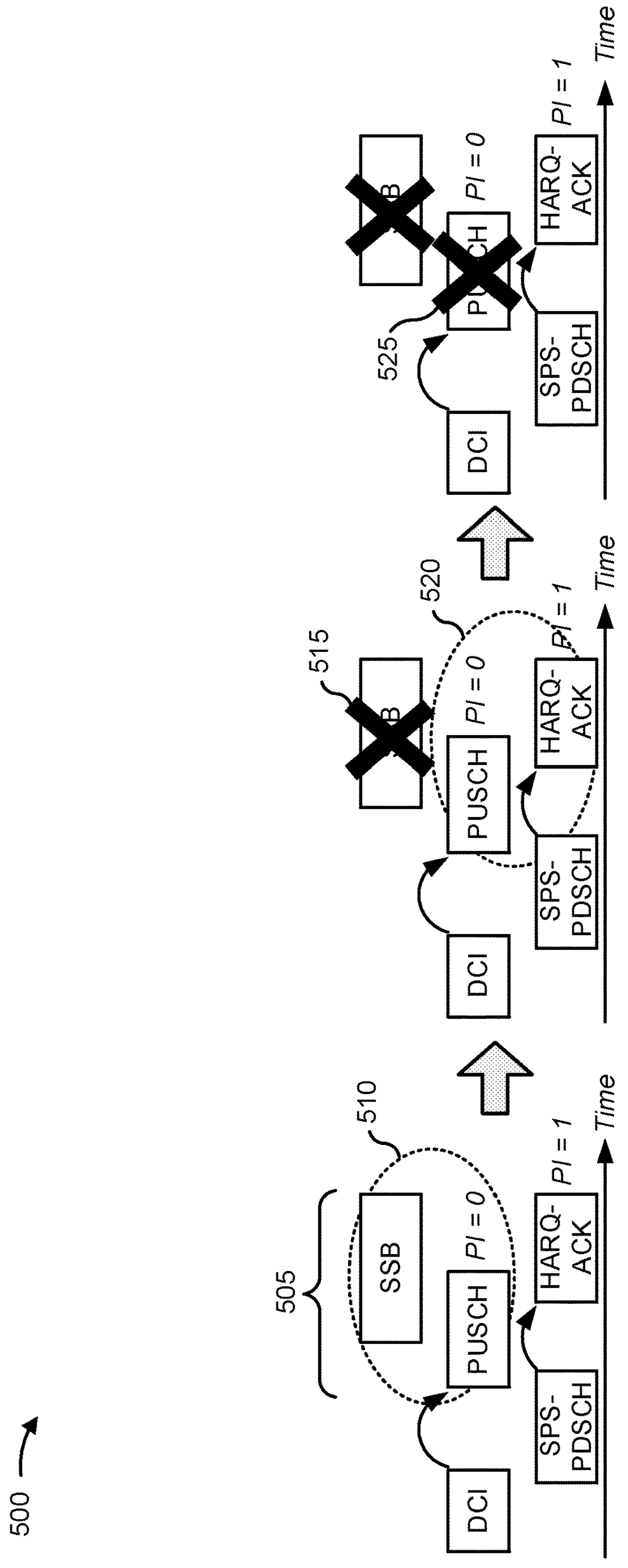

FIG. 5 is a diagram illustrating an example 500 associated with handling collision with SSB reception in a scenario where a priority of a semi-statically configured uplink transmission differs from a priority of a dynamically scheduled uplink transmission.

In the example shown in FIG. 5, a UE (e.g., a UE 120) is configured for SSB reception in a particular set of resources, is to transmit a semi-statically configured uplink transmission in a particular set of resources, and is to transmit a dynamically scheduled uplink transmission in a particular set of resources. As shown, the set of resources to be used for the SSB reception overlaps (in the time domain) the set of resources to be used for the semi-statically configured uplink transmission and the set of resources to be used for the dynamically scheduled uplink transmission. In this example, the semi-statically configured uplink transmission is a PUCCH transmission with a HARQ-ACK (e.g., corresponding to an SPS PDSCH transmission) and the dynamically scheduled uplink transmission is a PUSCH transmission (e.g., in response to a DCI format detection). As indicated in FIG. 5, a priority of the dynamically scheduled PUSCH transmission is lower than a priority of the semi-statically configured PUCCH transmission (e.g., the dynamically scheduled PUSCH transmission has a priority index value of 0 (PI=0) and the semi-statically configured PUCCH transmission has a priority index value of 1 (PI=1)).

In a first operation, as indicated by reference 505, the UE identifies that the set of resources to be used for the SSB reception overlaps the set of resources to be used for the dynamically scheduled PUSCH transmission and/or the set of resources to be used for the semi-statically configured PUCCH transmission. Notably, in this example, the set of resources to be used for the dynamically scheduled PUSCH transmission overlaps the set of resources to be used for the semi-statically configured PUCCH transmission.

In a second operation, as indicated by reference 510, the UE resolves an overlap between the lower priority uplink transmission—the dynamically scheduled PUSCH transmission—and the SSB reception. In some aspects, the UE resolves the overlap between the dynamically scheduled PUSCH transmission and the SSB reception (i.e., prior to resolving an overlap with the semi-statically configured PUCCH transmission) based on the dynamically scheduled PUSCH transmission having a lower priority than the semi-statically configured PUCCH transmission. As indicated by reference 515, a result of resolving the overlap between the dynamically scheduled PUSCH transmission and the SSB reception is that the UE cancels the SSB reception.

In a third operation, as indicated by reference 520, the UE then resolves an overlap between the (lower priority) dynamically scheduled PUSCH transmission and the (higher priority) semi-statically configured PUCCH transmission. In this example, because the semi-statically configured PUCCH has a higher priority than the dynamically scheduled PUSCH, the UE cancels the dynamically scheduled PUSCH transmission, as indicated by reference 525. Thus, in this example, the UE transmits the (higher priority) semi-statically configured PUCCH transmission.

In this way, the UE may resolve an overlap among an SSB reception, a semi-statically configured uplink transmission, and a dynamically scheduled uplink transmission, where the semi-statically configured uplink transmission and the dynamically scheduled uplink transmission have different priorities. For example, in some aspects, the UE may first resolve an overlap between the lower priority uplink transmission (e.g., the semi-statically configured uplink transmission or the dynamically scheduled uplink transmission) and the SSB reception, and may then resolve an overlap with the higher priority uplink transmission (e.g., the dynamically scheduled uplink transmission or the semi-statically configured uplink transmission) after resolving the overlap between the lower priority uplink transmission and the SSB reception.

As indicated above, FIG. 5 is provided as an example. Other examples may differ from what is described with respect to FIG. 5.

Figure 6:
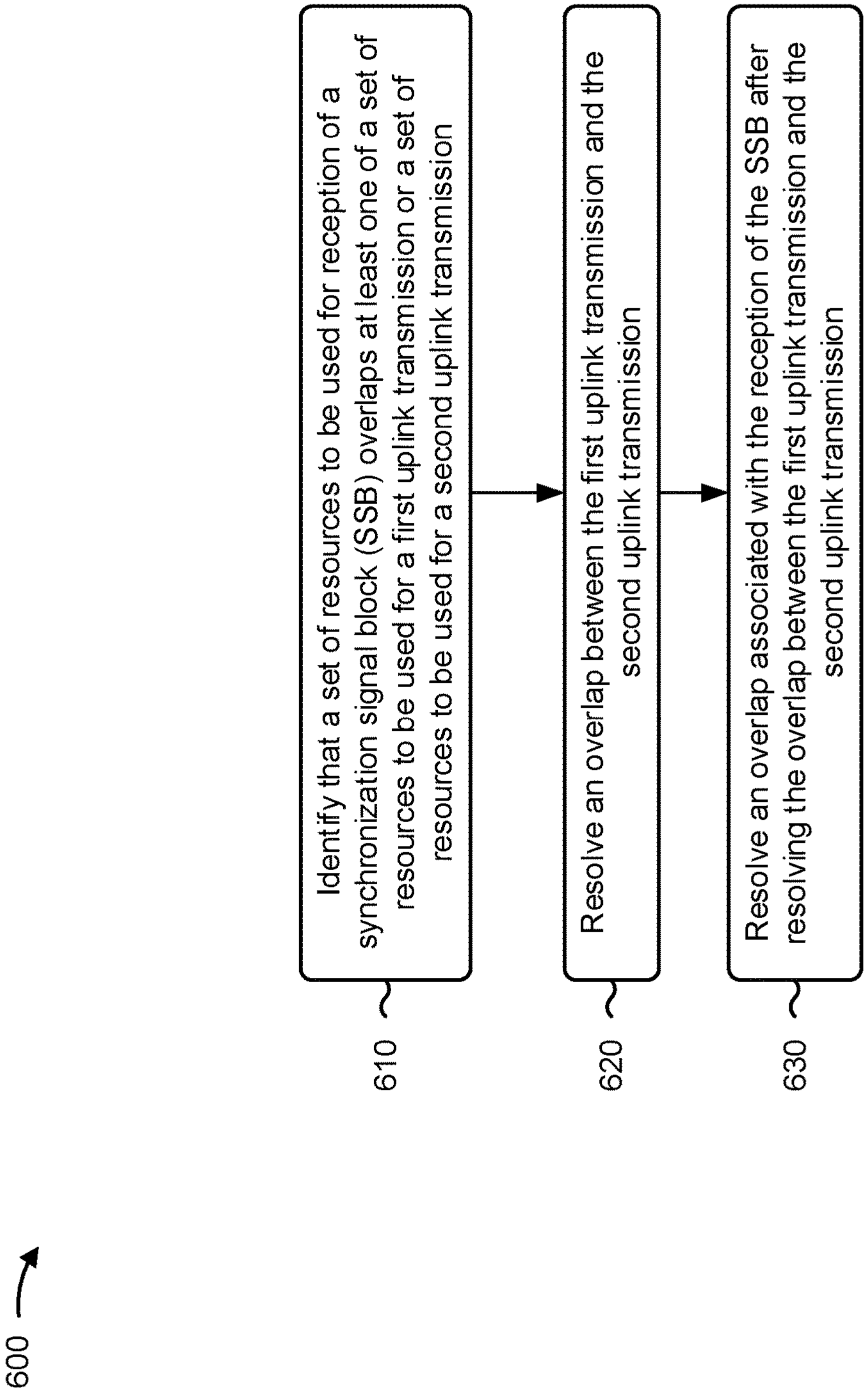
FIGS. 6 and 7 are diagrams illustrating example processes associated with handling a collision with SSB reception, in accordance with the present disclosure.

FIG. 6 is a diagram illustrating an example process 600 performed, for example, by a UE, in accordance with the present disclosure. Example process 600 is an example where the UE (e.g., UE 120) performs operations associated with handling collision with SSB reception.

As shown in FIG. 6, in some aspects, process 600 may include identifying that a set of resources to be used for reception of an SSB overlaps at least one of a set of resources to be used for a first uplink transmission or a set of resources to be used for a second uplink transmission (block 610). For example, the UE (e.g., using communication manager 140 and/or overlap identification component 808, depicted in FIG. 8) may identify that a set of resources to be used for reception of an SSB overlaps at least one of a set of resources to be used for a first uplink transmission or a set of resources to be used for a second uplink transmission, as described above. In some aspects, the set of resources to be used for the first uplink transmission overlaps the set of resources to be used for the second uplink transmission. In some aspects, the first uplink transmission and the second uplink transmission have a same priority index value.

As further shown in FIG. 6, in some aspects, process 600 may include resolving an overlap between the first uplink transmission and the second uplink transmission (block 620). For example, the UE (e.g., using communication manager 140 and/or overlap resolution component 810, depicted in FIG. 8) may resolve an overlap between the first uplink transmission and the second uplink transmission, as described above.

As further shown in FIG. 6, in some aspects, process 600 may include resolving an overlap associated with the reception of the SSB after resolving the overlap between the first uplink transmission and the second uplink transmission (block 630). For example, the UE (e.g., using communication manager 140 and/or overlap resolution component 810, depicted in FIG. 8) may resolve an overlap associated with the reception of the SSB after resolving the overlap between the first uplink transmission and the second uplink transmission, as described above.

Process 600 may include additional aspects, such as any single aspect or any combination of aspects described below and/or in connection with one or more other processes described elsewhere herein.

In a first aspect, the first uplink transmission is a dynamically scheduled uplink transmission and the second uplink transmission is a semi-statically configured uplink transmission.

In a second aspect, alone or in combination with the first aspect, the first uplink transmission is a PUCCH transmission and the second uplink transmission is a PUSCH transmission.

In a third aspect, alone or in combination with one or more of the first and second aspects, the first uplink transmission is a PUSCH transmission and the second uplink transmission is a PUCCH transmission.

In a fourth aspect, alone or in combination with one or more of the first through third aspects, resolving the overlap between the first uplink transmission and the second uplink transmission comprises multiplexing the second uplink transmission and the first uplink transmission in the set of resources to be used for the first uplink transmission.

In a fifth aspect, alone or in combination with one or more of the first through fourth aspects, resolving the overlap associated with the reception of the SSB comprises canceling the reception of the SSB.

In a sixth aspect, alone or in combination with one or more of the first through fifth aspects, resolving the overlap between the first uplink transmission and the second uplink transmission comprises canceling the first uplink transmission.

In a seventh aspect, alone or in combination with one or more of the first through sixth aspects, resolving the overlap associated with the reception of the SSB comprises canceling the second uplink transmission, and attempting the reception of the SSB.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
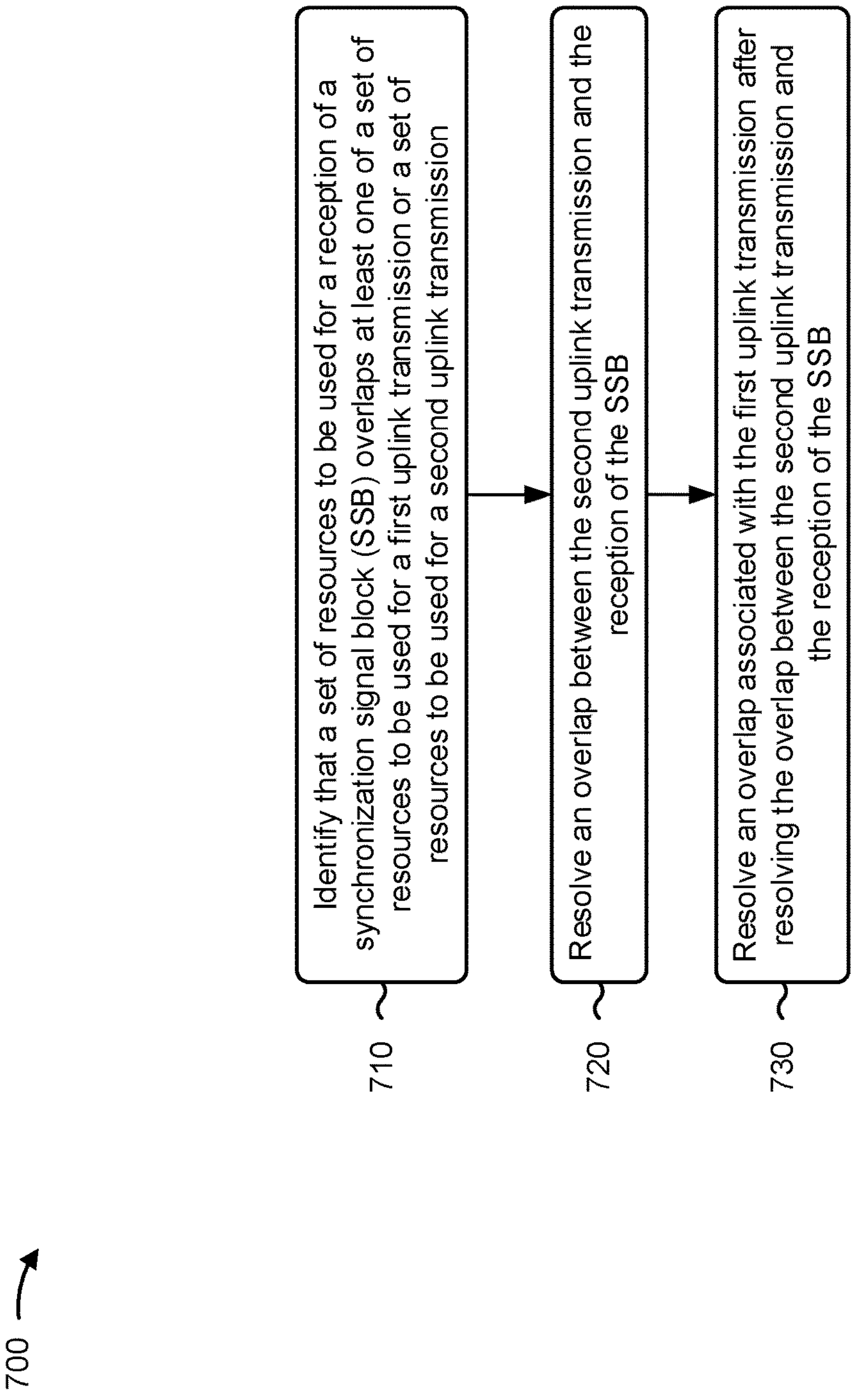

FIG. 7 is a diagram illustrating an example process 700 performed, for example, by a UE, in accordance with the present disclosure. Example process 700 is an example where the UE (e.g., UE 120) performs operations associated with handling collision with SSB reception.

As shown in FIG. 7, in some aspects, process 700 may include identifying that a set of resources to be used for a reception of an SSB overlaps at least one of a set of resources to be used for a first uplink transmission or a set of resources to be used for a second uplink transmission (block 710). For example, the UE (e.g., using communication manager 140 and/or overlap identification component 808, depicted in FIG. 8) may identify that a set of resources to be used for a reception of an SSB overlaps at least one of a set of resources to be used for a first uplink transmission or a set of resources to be used for a second uplink transmission, as described above. In some aspects, the set of resources to be used for the first uplink transmission overlaps the set of resources to be used for the second uplink transmission. In some aspects, a priority index value of the second uplink transmission is lower than a priority index value of the first uplink transmission.

As further shown in FIG. 7, in some aspects, process 700 may include resolving an overlap between the second uplink transmission and the reception of the SSB (block 720). For example, the UE (e.g., using communication manager 140 and/or overlap resolution component 810, depicted in FIG. 8) may resolve an overlap between the second uplink transmission and the reception of the SSB, as described above.

As further shown in FIG. 7, in some aspects, process 700 may include resolving an overlap associated with the first uplink transmission after resolving the overlap between the second uplink transmission and the reception of the SSB (block 730). For example, the UE (e.g., using communication manager 140 and/or overlap resolution component 810, depicted in FIG. 8) may resolve an overlap associated with the first uplink transmission after resolving the overlap between the second uplink transmission and the reception of the SSB, as described above.

Process 700 may include additional aspects, such as any single aspect or any combination of aspects described below and/or in connection with one or more other processes described elsewhere herein.

In a first aspect, the first uplink transmission is a dynamically scheduled uplink transmission and the second uplink transmission is a semi-statically configured uplink transmission.

In a second aspect, alone or in combination with the first aspect, the first uplink transmission is a PUCCH transmission and the second uplink transmission is a PUSCH transmission.

In a third aspect, alone or in combination with one or more of the first and second aspects, the first uplink transmission is a PUSCH transmission and the second uplink transmission is a PUCCH transmission.

In a fourth aspect, alone or in combination with one or more of the first through third aspects, the first uplink transmission is a semi-statically configured uplink transmission and the second uplink transmission is a dynamically scheduled uplink transmission.

In a fifth aspect, alone or in combination with one or more of the first through fourth aspects, the first uplink transmission is a PUCCH transmission and the second uplink transmission is a PUSCH transmission.

In a sixth aspect, alone or in combination with one or more of the first through fifth aspects, the first uplink transmission is a PUSCH transmission and the second uplink transmission is a PUCCH transmission.

In a seventh aspect, alone or in combination with one or more of the first through sixth aspects, resolving the overlap between the second uplink transmission and the reception of the SSB comprises canceling the reception of the SSB.

In an eighth aspect, alone or in combination with one or more of the first through seventh aspects, resolving the overlap associated with the first uplink transmission comprises canceling the second uplink transmission, and transmitting the first uplink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
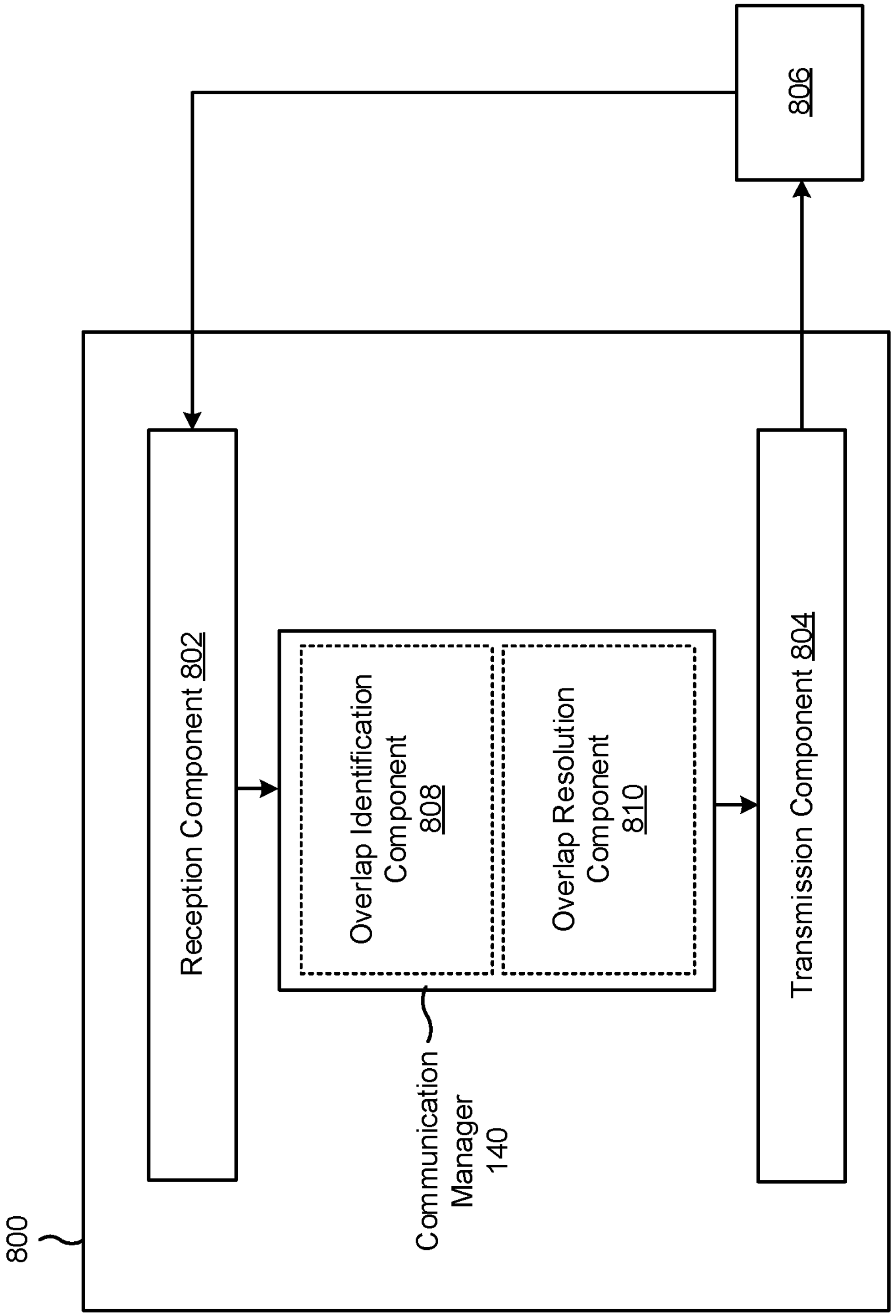
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of an overlap identification component 808 or an overlap resolution component 810, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

In some aspects, the overlap identification component 808 may identify that a set of resources to be used for reception of a SSB overlaps at least one of a set of resources to be used for a first uplink transmission or a set of resources to be used for a second uplink transmission. In some aspects, the set of resources to be used for the first uplink transmission overlaps the set of resources to be used for the second uplink transmission. In some aspects, the first uplink transmission and the second uplink transmission have a same priority index value. In some aspects, the overlap resolution component 810 may resolve an overlap between the first uplink transmission and the second uplink transmission. In some aspects, the overlap resolution component 810 may resolve an overlap associated with the reception of the SSB after resolving the overlap between the first uplink transmission and the second uplink transmission.

In some aspects, the identification component 808 may identify that a set of resources to be used for a reception of an SSB overlaps at least one of a set of resources to be used for a first uplink transmission or a set of resources to be used for a second uplink transmission wherein the set of resources to be used for the first uplink transmission overlaps the set of resources to be used for the second uplink transmission, and wherein a priority index value of the second uplink transmission is lower than a priority index value of the first uplink transmission. In some aspects, the overlap resolution component 810 may resolve an overlap between the second uplink transmission and the reception of the SSB. In some aspects, the overlap resolution component 810 may resolve an overlap associated with the first uplink transmission after resolving the overlap between the second uplink transmission and the reception of the SSB.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: identifying that a set of resources to be used for reception of a synchronization signal block (SSB) overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein the first uplink transmission and the second uplink transmission have a same priority index value; resolving an overlap between the first uplink transmission and the second uplink transmission; and resolving an overlap associated with the reception of the SSB after resolving the overlap between the first uplink transmission and the second uplink transmission.

Aspect 2: The method of Aspect 1, wherein the first uplink transmission is a dynamically scheduled uplink transmission and the second uplink transmission is a semi-statically configured uplink transmission.

Aspect 3: The method of Aspect 2, wherein the first uplink transmission is a physical uplink control channel (PUCCH) transmission and the second uplink transmission is a physical uplink shared channel (PUSCH) transmission.

Aspect 4: The method of Aspect 2, wherein the first uplink transmission is a physical uplink shared channel (PUSCH) transmission and the second uplink transmission is a physical uplink control channel (PUCCH) transmission.

Aspect 5: The method of any of Aspects 1-4, wherein resolving the overlap between the first uplink transmission and the second uplink transmission comprises multiplexing the second uplink transmission and the first uplink transmission in the set of resources to be used for the first uplink transmission.

Aspect 6: The method of Aspect 5, wherein resolving the overlap associated with the reception of the SSB comprises canceling the reception of the SSB.

Aspect 7: The method of any of Aspects 1-4, wherein resolving the overlap between the first uplink transmission and the second uplink transmission comprises canceling the first uplink transmission.

Aspect 8: The method of Aspect 7, wherein resolving the overlap associated with the reception of the SSB comprises: canceling the second uplink transmission, and attempting the reception of the SSB.

Aspect 9: A method of wireless communication performed by a user equipment (UE), comprising: identifying that a set of resources to be used for a reception of a synchronization signal block (SSB) overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein a priority index value of the second uplink transmission is lower than a priority index value of the first uplink transmission; resolving an overlap between the second uplink transmission and the reception of the SSB; and resolving an overlap associated with the first uplink transmission after resolving the overlap between the second uplink transmission and the reception of the SSB.

Aspect 10: The method of Aspect 9, wherein the first uplink transmission is a dynamically scheduled uplink transmission and the second uplink transmission is a semi-statically configured uplink transmission.

Aspect 11: The method of Aspect 10, wherein the first uplink transmission is a physical uplink control channel (PUCCH) transmission and the second uplink transmission is a physical uplink shared channel (PUSCH) transmission.

Aspect 12: The method of Aspect 10, wherein the first uplink transmission is a physical uplink shared channel (PUSCH) transmission and the second uplink transmission is a physical uplink control channel (PUCCH) transmission.

Aspect 13: The method of Aspect 9, wherein the first uplink transmission is a semi-statically configured uplink transmission and the second uplink transmission is a dynamically scheduled uplink transmission.

Aspect 14: The method of Aspect 13, wherein the first uplink transmission is a physical uplink control channel (PUCCH) transmission and the second uplink transmission is a physical uplink shared channel (PUSCH) transmission.

Aspect 15: The method of Aspect 13, wherein the first uplink transmission is a physical uplink shared channel (PUSCH) transmission and the second uplink transmission is a physical uplink control channel (PUCCH) transmission.

Aspect 16: The method of any of Aspects 9-15, wherein resolving the overlap between the second uplink transmission and the reception of the SSB comprises canceling the reception of the SSB.

Aspect 17: The method of Aspect 16, wherein resolving the overlap associated with the first uplink transmission comprises: canceling the second uplink transmission and transmitting the first uplink transmission.

Aspect 18: An apparatus for wireless communication at a device, comprising a processor; memory coupled with the processor; and instructions stored in the memory and executable by the processor to cause the apparatus to perform the method of one or more of Aspects 1-8.

Aspect 19: A device for wireless communication, comprising a memory and one or more processors coupled to the memory, the one or more processors configured to perform the method of one or more of Aspects 1-8.

Aspect 20: An apparatus for wireless communication, comprising at least one means for performing the method of one or more of Aspects 1-8.

Aspect 21: A non-transitory computer-readable medium storing code for wireless communication, the code comprising instructions executable by a processor to perform the method of one or more of Aspects 1-8.

Aspect 22: A non-transitory computer-readable medium storing a set of instructions for wireless communication, the set of instructions comprising one or more instructions that, when executed by one or more processors of a device, cause the device to perform the method of one or more of Aspects 1-8.

Aspect 23: An apparatus for wireless communication at a device, comprising a processor; memory coupled with the processor; and instructions stored in the memory and executable by the processor to cause the apparatus to perform the method of one or more of Aspects 9-17.

Aspect 24: A device for wireless communication, comprising a memory and one or more processors coupled to the memory, the one or more processors configured to perform the method of one or more of Aspects 9-17.

Aspect 25: An apparatus for wireless communication, comprising at least one means for performing the method of one or more of Aspects 9-17.

Aspect 26: A non-transitory computer-readable medium storing code for wireless communication, the code comprising instructions executable by a processor to perform the method of one or more of Aspects 9-17.

Aspect 27: A non-transitory computer-readable medium storing a set of instructions for wireless communication, the set of instructions comprising one or more instructions that, when executed by one or more processors of a device, cause the device to perform the method of one or more of Aspects 9-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
- one or more memories; and
- one or more processors, coupled to the one or more memories, configured to cause the UE to:
  - identify that a set of resources to be used for reception of a synchronization signal block (SSB) overlaps at least one of a set of resources to be used for a first uplink transmission or a set of resources to be used for a second uplink transmission,
    - wherein the set of resources to be used for the first uplink transmission overlaps the set of resources to be used for the second uplink transmission, and
    - wherein the first uplink transmission and the second uplink transmission have a same priority index value;
  - resolve an overlap between the first uplink transmission and the second uplink transmission; and
  - resolve an overlap associated with the reception of the SSB after resolving the overlap between the first uplink transmission and the second uplink transmission.

2. The UE of claim 1, wherein the first uplink transmission is a dynamically scheduled uplink transmission and the second uplink transmission is a semi-statically configured uplink transmission.

3. The UE of claim 2, wherein the first uplink transmission is a physical uplink control channel (PUCCH) transmission and the second uplink transmission is a physical uplink shared channel (PUSCH) transmission.

4. The UE of claim 2, wherein the first uplink transmission is a physical uplink shared channel (PUSCH) transmission and the second uplink transmission is a physical uplink control channel (PUCCH) transmission.

5. The UE of claim 1, wherein the one or more processors, when resolving the overlap between the first uplink transmission and the second uplink transmission, are configured to cause the UE to:
- multiplex the second uplink transmission and the first uplink transmission in the set of resources to be used for the first uplink transmission.

6. The UE of claim 5, wherein the one or more processors, when resolving the overlap associated with the reception of the SSB, are configured to cause the UE to:
- cancel the reception of the SSB.

7. The UE of claim 1, wherein the one or more processors, when resolving the overlap between the first uplink transmission and the second uplink transmission, are configured to cause the UE to:
- cancel the first uplink transmission.

8. The UE of claim 7, wherein the one or more processors, when resolving the overlap associated with the reception of the SSB, are configured to cause the UE to:
- cancel the second uplink transmission, and
- attempt the reception of the SSB.

9. A UE for wireless communication, comprising:
- one or more memories; and
- one or more processors, coupled to the one or more memories, configured to cause the UE to:
  - identify that a set of resources to be used for a reception of a synchronization signal block (SSB) overlaps at least one of a set of resources to be used for a first uplink transmission or a set of resources to be used for a second uplink transmission,
    - wherein the set of resources to be used for the first uplink transmission overlaps the set of resources to be used for the second uplink transmission, and
    - wherein a priority index value of the second uplink transmission is lower than a priority index value of the first uplink transmission;
  - resolve an overlap between the second uplink transmission and the reception of the SSB; and
  - resolve an overlap associated with the first uplink transmission after resolving the overlap between the second uplink transmission and the reception of the SSB.

10. The UE of claim 9, wherein the first uplink transmission is a dynamically scheduled uplink transmission and the second uplink transmission is a semi-statically configured uplink transmission.

11. The UE of claim 10, wherein the first uplink transmission is a physical uplink control channel (PUCCH) transmission and the second uplink transmission is a physical uplink shared channel (PUSCH) transmission.

12. The UE of claim 10, wherein the first uplink transmission is a physical uplink shared channel (PUSCH) transmission and the second uplink transmission is a physical uplink control channel (PUCCH) transmission.

13. The UE of claim 9, wherein the first uplink transmission is a semi-statically configured uplink transmission and the second uplink transmission is a dynamically scheduled uplink transmission.

14. The UE of claim 13, wherein the first uplink transmission is a physical uplink control channel (PUCCH) transmission and the second uplink transmission is a physical uplink shared channel (PUSCH) transmission.

15. The UE of claim 13, wherein the first uplink transmission is a physical uplink shared channel (PUSCH) transmission and the second uplink transmission is a physical uplink control channel (PUCCH) transmission.

16. The UE of claim 9, wherein the one or more processors, when resolving the overlap between the second uplink transmission and the reception of the SSB, are configured to cause the UE to:
- cancel the reception of the SSB.

17. The UE of claim 16, wherein the one or more processors, when resolving the overlap associated with the first uplink transmission, are configured to cause the UE to:

cancel the second uplink transmission, and transmit the first uplink transmission.

18. A method of wireless communication performed by a user equipment (UE), comprising:

identifying that a set of resources to be used for reception of a synchronization signal block (SSB) overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein the first uplink transmission and the second uplink transmission have a same priority index value;

resolving an overlap between the first uplink transmission and the second uplink transmission; and resolving an overlap associated with the reception of the SSB after resolving the overlap between the first uplink transmission and the second uplink transmission.

19. The method of claim 18, wherein the first uplink transmission is a dynamically scheduled uplink transmission and the second uplink transmission is a semi-statically configured uplink transmission.

20. The method of claim 18, wherein resolving the overlap between the first uplink transmission and the second uplink transmission comprises multiplexing the second uplink transmission and the first uplink transmission in the set of resources to be used for the first uplink transmission.

21. The method of claim 18, wherein resolving the overlap between the first uplink transmission and the second uplink transmission comprises canceling the first uplink transmission.

22. A method of wireless communication performed by a user equipment (UE), comprising:

identifying that a set of resources to be used for a reception of a synchronization signal block (SSB) overlaps at least one of a set of resources to be used for a first uplink transmission or a set of resources to be used for a second uplink transmission, wherein the set of resources to be used for the first uplink transmission overlaps the set of resources to be used for the second uplink transmission, and wherein a priority index value of the second uplink transmission is lower than a priority index value of the first uplink transmission;

resolving an overlap between the second uplink transmission and the reception of the SSB; and resolving an overlap associated with the first uplink transmission after resolving the overlap between the second uplink transmission and the reception of the SSB.

23. The method of claim 22, wherein the first uplink transmission is a dynamically scheduled uplink transmission and the second uplink transmission is a semi-statically configured uplink transmission.

24. The method of claim 22, wherein the first uplink transmission is a semi-statically configured uplink transmission and the second uplink transmission is a dynamically scheduled uplink transmission.

25. The method of claim 22, wherein resolving the overlap between the second uplink transmission and the reception of the SSB comprises canceling the reception of the SSB.

* * * * *